United States Patent
Ogasawara et al.

(10) Patent No.: US 10,862,138 B2
(45) Date of Patent: Dec. 8, 2020

(54) ELECTROCHEMICAL CELL AND CELL STACK DEVICE

(71) Applicant: NGK INSULATORS, LTD., Nagoya (JP)

(72) Inventors: Noriyuki Ogasawara, Nagoya (JP); Hirofumi Kan, Nagoya (JP); Makoto Ohmori, Nagoya (JP); Takashi Ryu, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/544,140

(22) Filed: Aug. 19, 2019

(65) Prior Publication Data

US 2020/0020959 A1 Jan. 16, 2020

Related U.S. Application Data

(63) Continuation of application No. PCT/JP2019/008135, filed on Mar. 1, 2019.

(30) Foreign Application Priority Data

Jul. 12, 2018 (JP) .................. 2018-132610

(51) Int. Cl.
*H01M 8/0247* (2016.01)
*H01M 8/04014* (2016.01)
(Continued)

(52) U.S. Cl.
CPC ..... *H01M 8/0247* (2013.01); *H01M 8/04014* (2013.01); *H01M 8/242* (2013.01); *H01M 8/2483* (2016.02)

(58) Field of Classification Search
CPC ........... H01M 8/0247; H01M 8/04014; H01M 8/242; H01M 8/2483
See application file for complete search history.

(56) References Cited

U.S. PATENT DOCUMENTS

| | | | |
|---|---|---|---|
| 6,344,290 B1 * | 2/2002 | Bossel | H01M 8/0204 429/456 |
| 2003/0049506 A1 | 3/2003 | Yang et al. | |
| 2017/0141426 A1 * | 5/2017 | Ohmori | H01M 8/2485 |

FOREIGN PATENT DOCUMENTS

| | | |
|---|---|---|
| JP | 62-073571 A | 4/1987 |
| JP | 2007-211268 A | 8/2007 |

(Continued)

OTHER PUBLICATIONS

English International Search Report for corresponding application No. PCT/JP2019/008135, dated Apr. 23, 2019 (2 pages).
(Continued)

*Primary Examiner* — Sarah A. Slifka
*Assistant Examiner* — Brent C Thomas
(74) *Attorney, Agent, or Firm* — Flynn Thiel, P.C.

(57) ABSTRACT

A fuel cell includes a porous support substrate and a power generation element portion. The support substrate includes a first end portion that is linked to a gas supply chamber and a gas collection portion, and a second end portion that is located opposite to the first end portion. The support substrate includes a first gas channel and a second gas channel. The first gas channel extends from the first end portion toward the second end portion. The first gas channel is connected to the gas supply chamber. The second gas channel is connected to the first gas channel on the second end portion side. The second gas channel extends from the second end portion toward the first end portion. The second gas channel is connected to the gas collection chamber. The support substrate is configured such that gas flows in the support substrate and moves between the first gas channel and the second gas channel, in a portion of the support substrate that is farther toward the first end portion side than the power generation element portion is.

6 Claims, 11 Drawing Sheets

(51) Int. Cl.
    *H01M 8/242*     (2016.01)
    *H01M 8/2483*    (2016.01)

(56)             References Cited

FOREIGN PATENT DOCUMENTS

JP       2012-209121 A     10/2012
JP       2014-194065 A     10/2014
JP       2015-025151 A      2/2015
JP       2015-053186 A      3/2015
JP       2016-171064 A      9/2016
JP       2017-017023 A      1/2017

OTHER PUBLICATIONS

International Search Report and Written Opinion of corresponding PCT/JP2019/008135, dated Apr. 23, 2019, in both Japanese and English (16 pages).
German Office Action with English Translation issued in corresponding Application No. 11 2019 000 029.2, dated Mar. 27, 2020 (10 pages).

* cited by examiner

ELECTROCHEMICAL CELL AND CELL STACK DEVICE

CROSS-REFERENCE TO RELATED APPLICATIONS

This application is a continuation application of PCT/JP2019/008135, filed Mar. 1, 2019, which claims priority to Japanese Application No. 2018-132610, filed Jul. 12, 2018, the entire contents all of which are incorporated hereby by reference.

TECHNICAL FIELD

The present invention relates to an electrochemical cell and a cell stack device.

BACKGROUND ART

A cell stack device including an electrochemical cell and a manifold for supplying gas to the electrochemical cell is known. The electrochemical cell includes a support substrate and a power generation element portion. The support substrate is provided with a gas channel. The power generation element portion is supported by the support substrate. Supply gas is supplied from a first end portion of the support substrate to the gas channel, whereas unreacted gas is ejected from a second end portion of the support substrate to the outside.

CITATION LIST

Patent Literature

Patent Literature 1: JP 2016-171064A

SUMMARY

Technical Problem

There is a demand for an improvement in the efficiency of gas usage in an electrochemical cell and a cell stack device as described above. In view of this, the present invention aims to provide an electrochemical cell and a cell stack device capable of improving the efficiency of gas usage.

Solution to Problem

An electrochemical cell according to a first aspect of the present invention is configured to be linked to a gas supply portion and a gas collection portion. The electrochemical cell includes a porous support substrate and a power generation element portion. The support substrate has a flat shape. The support substrate includes a first end portion that is configured to be linked to the gas supply portion and the gas collection portion, and a second end portion that is located opposite to the first end portion. The power generation element portion is disposed on a main surface of the support substrate. The support substrate includes at least one first gas channel and at least one second gas channel. The first gas channel extends from the first end portion toward the second end portion. Also, the first gas channel is configured to be connected to the gas supply portion. The second gas channel is connected to the first gas channel on the second end portion side. The second gas channel extends from the second end portion toward the first end portion. The second gas channel is configured to be connected to the gas collection portion. The support substrate is configured such that gas flows in the support substrate and moves between the first gas channel and the second gas channel, in a portion of the support substrate that is farther toward the first end portion side than the power generation element portion is.

With this configuration, unreacted gas in gas that has flowed through the first gas channel flows through the second gas channel, and unreacted gas in the gas that has flowed through the second gas channel is collected in the gas collection chamber of a gas manifold. Thus, it is possible to improve the efficiency of gas usage.

Also, if the electrochemical cell configured as described above is used as a solid oxide fuel cell (SOFC), it is possible to obtain effects such as the following. In a system in which gas collected in a gas collection chamber is burned with use of a gas burner simply in the solid oxide fuel cell, there is a risk that a misfire will occur in a case where the solid oxide fuel cell instantaneously has a fuel gas utilization rate of 100%. In contrast, with the electrochemical cell configured as described above, unreacted gas before reaching the power generation element portion flows through the support substrate from the first gas channel to the second gas channel, and thus the unreacted gas can be burned with use of the gas burner. As a result, it is possible to inhibit the occurrence of a misfire.

Preferably, the electrochemical cell further includes a connection member. The connection member includes a connection channel for connecting the first gas channel and the second gas channel. The connection member is attached to the second end portion of the support substrate.

Preferably, the support substrate further includes a connection channel for connecting the first gas channel and the second gas channel in the second end portion.

Preferably, the at least one first gas channel includes a plurality of first gas channels. Also, the at least one second gas channel includes a plurality of second gas channels. Also, the number of connection channels is only one.

Preferably, a distance between a first gas channel and a second gas channel that are adjacent to each other is larger than a distance between first gas channels that are adjacent to each other.

A cell stack device according to a second aspect of the present invention includes any of the above-described electrochemical cells and a manifold configured to support the first end portion of the support substrate. The manifold includes a gas supply chamber that is connected to the first gas channel and a gas collection chamber that is connected to the second gas channel.

Advantageous Effects

According to the present invention, it is possible to improve the efficiency of gas usage.

DESCRIPTION OF EMBODIMENTS

Figure 1:
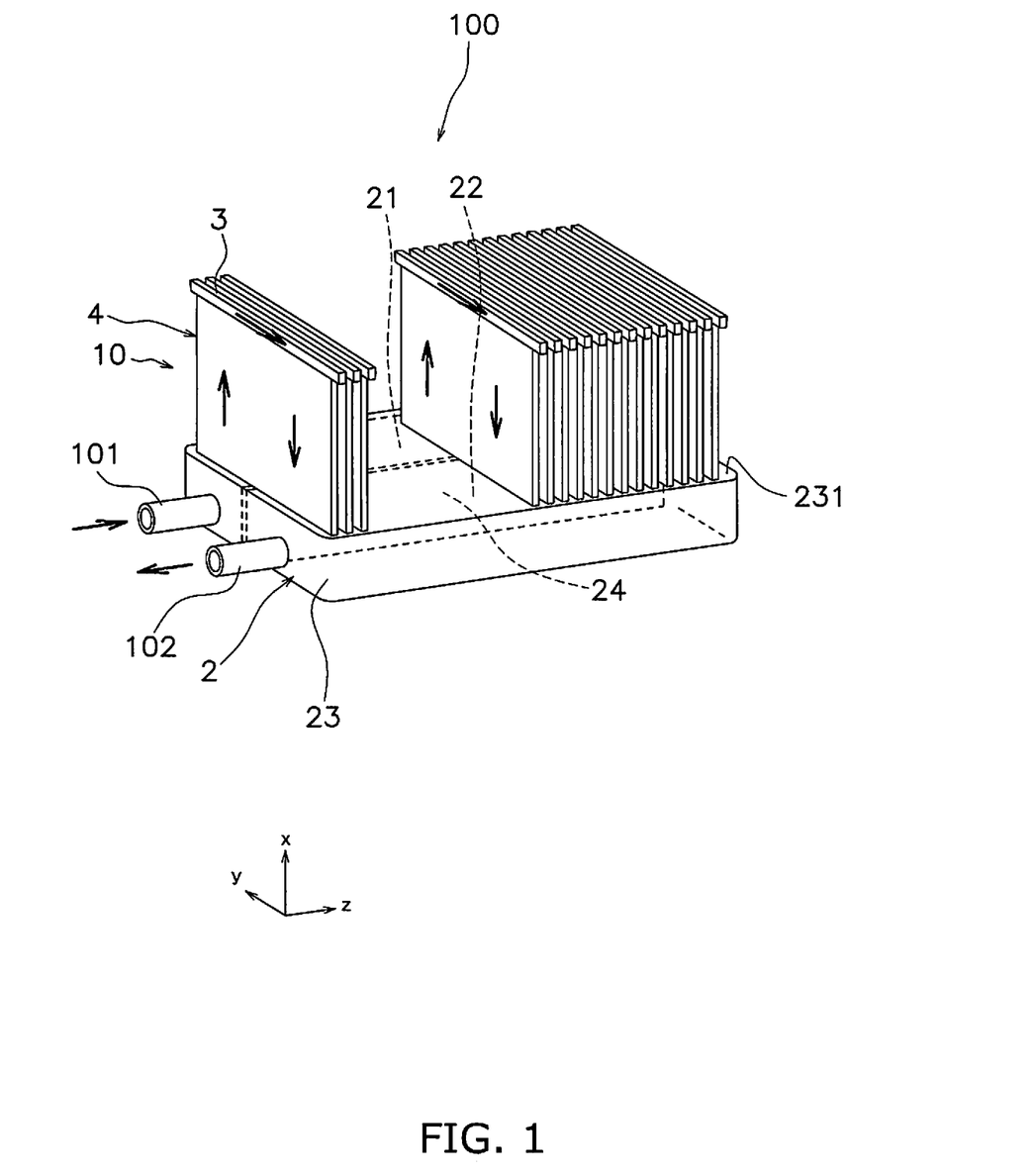
FIG. 1 is a perspective view of a cell stack device.

Hereinafter, embodiments of an electrochemical cell and a cell stack device according to the present invention will be described with reference to the drawings. Note that this embodiment will be described using, as one example of an electrochemical cell, a fuel cell, more specifically, a solid oxide fuel cell (SOFC). FIG. 1 is a perspective view showing a cell stack device. Note that some fuel cells are not shown in FIG. 1.

Cell Stack Device

As shown in FIG. 1, a cell stack device 100 includes a manifold 2 and a plurality of fuel cells 10.

Manifold

The manifold 2 is configured to supply gas to the fuel cells 10. Also, the manifold 2 is configured to collect gas ejected from the fuel cells 10. The manifold 2 includes a gas supply chamber 21 (one example of a gas supply portion) and a gas collection chamber 22 (one example of a gas collection portion). A gas supply pipe 101 is connected to the gas supply chamber 21, and a gas collection pipe 102 is connected to the gas collection chamber 22. Fuel gas is supplied to the gas supply chamber 21 through the gas supply pipe 101. Also, fuel gas in the gas collection chamber 22 is collected from the manifold 2 through the gas collection pipe 102.

The manifold 2 includes a manifold main body 23 and a partition plate 24. The manifold main body 23 has an internal space. The manifold main body 23 has a rectangular parallelepiped shape.

Figure 2:
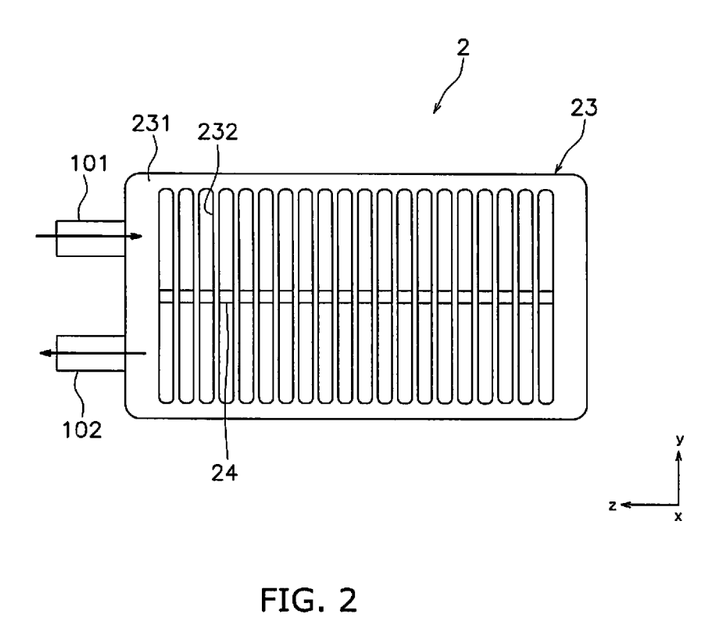
FIG. 2 is a plan view of a manifold.

As shown in FIG. 2, an upper plate portion 231 of the manifold main body 23 is provided with a plurality of through holes 232. The through holes 232 are arranged at intervals in a length direction (the Z-axis direction) of the manifold main body 23. The through holes 232 extend in a width direction (the Y-axis direction) of the manifold main body 23. The through holes 232 are in communication with the gas supply chamber 21 and the gas collection chamber 22. Note that each through hole 232 may be divided into a portion that is in communication with the gas supply chamber 21 and a portion that is in communication with the gas collection chamber 22.

The partition plate 24 partitions the space of the manifold main body 23 into the gas supply chamber 21 and the gas collection chamber 22. Specifically, the partition plate 24 extends in the length direction of the manifold main body 23 at a substantially central portion of the manifold main body 23. The partition plate 24 needs not completely partition the space of the manifold main body 23, and a gap may be formed between the partition plate 24 and the manifold main body 23.

Fuel Cell

The fuel cells 10 extend upward from the manifold 2. Specifically, lower end portions of the fuel cells 10 are attached to the manifold 2. The fuel cells 10 are arranged such that main surfaces of the fuel cells 10 face each other. Also, the fuel cells 10 are arranged at intervals in the length direction of the manifold 2. That is, the arrangement direction of the fuel cells 10 is along the length direction of the manifold 2. Note that the fuel cells 10 need not be disposed at equal intervals in the length direction of the manifold 2.

Figure 3:
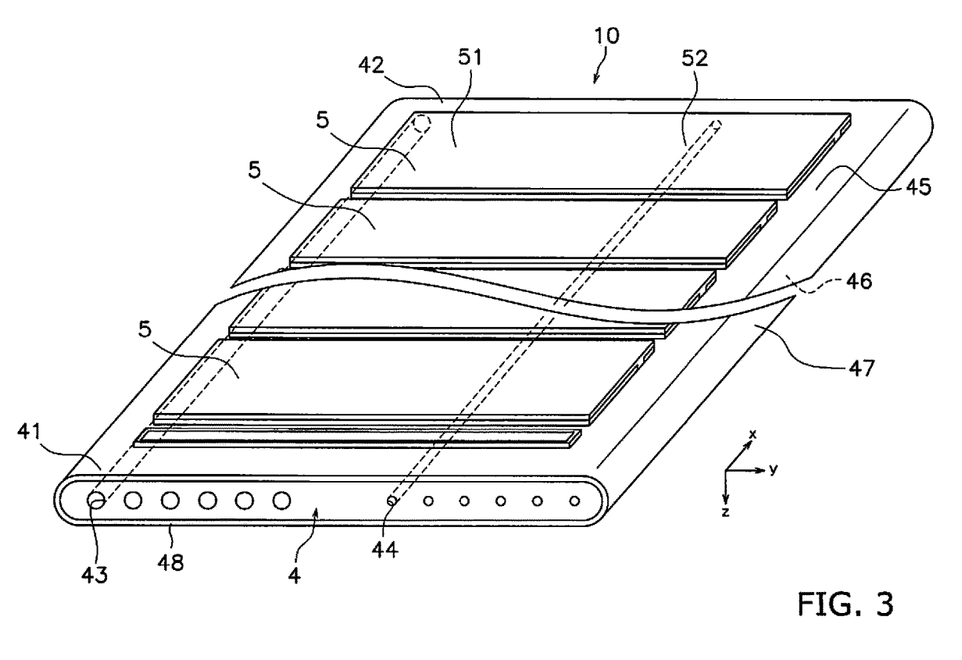
FIG. 3 is a perspective view of a fuel cell.
Figure 4:
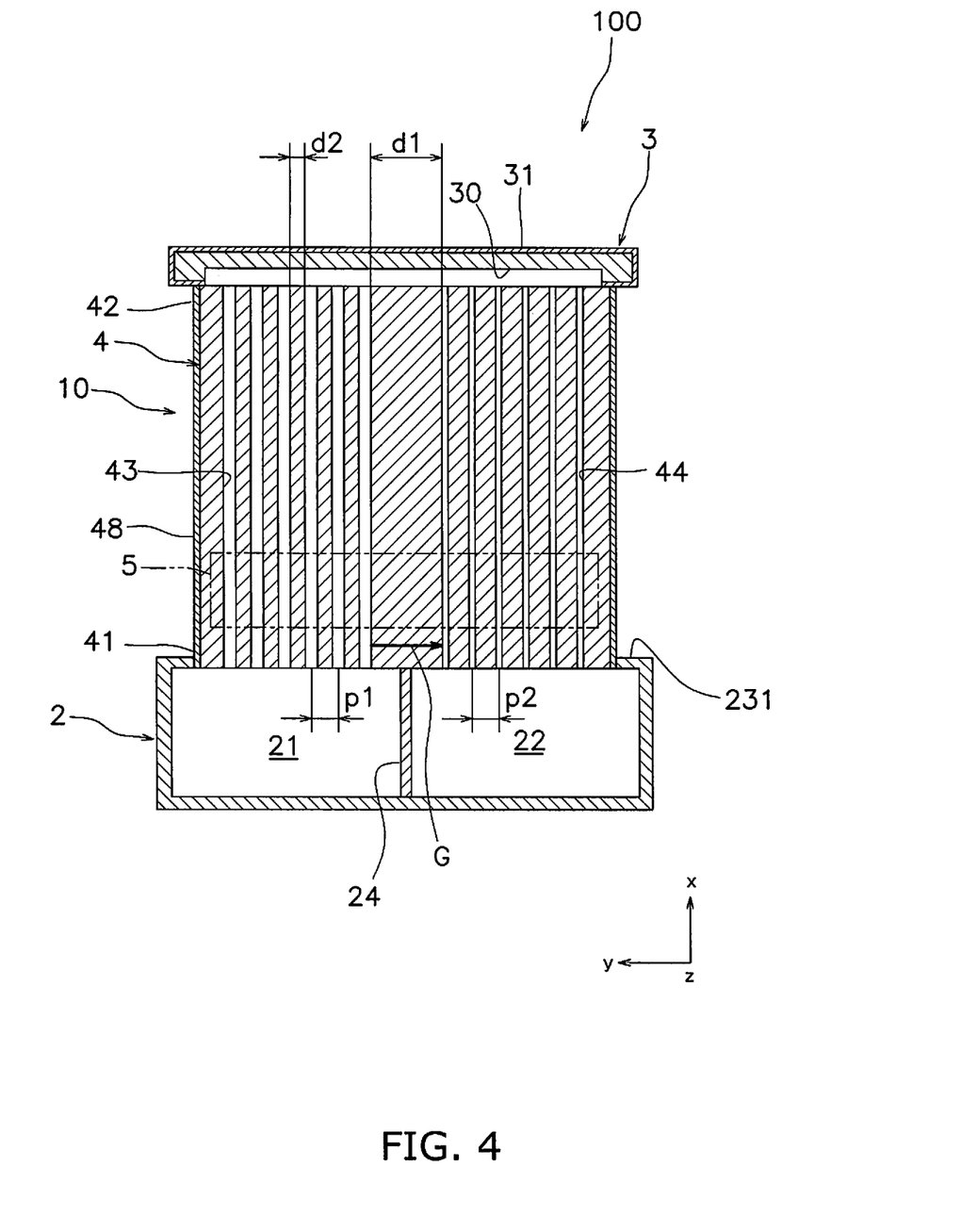
FIG. 4 is a cross-sectional view of the cell stack device.

As shown in FIGS. 3 and 4, the fuel cells 10 each include a support substrate 4, a plurality of power generation element portions 5, and a connection member 3. The power generation element portions 5 are supported on a first main surface 45 and a second main surface 46 of the support substrate 4. Note that the number of power generation element portions 5 formed on the first main surface 45 and the number of power generation element portions 5 formed on the second main surface 46 may be the same or different from each other. Also, the power generation element portions 5 may have different sizes.

Support Substrate

The support substrate 4 extends from the manifold 2 in the vertical direction. Specifically, the support substrate 4 extends upward from the manifold 2. The support substrate 4 has a flat shape, and has a first end portion 41 and a second end portion 42. The first end portion 41 and the second end portion 42 are both end portions of the support substrate 4 in the length direction (the X-axis direction).

The first end portion 41 of the support substrate 4 is attached to the manifold 2. For example, the first end portion 41 of the support substrate 4 is attached to the upper plate portion 231 of the manifold 2 with use of a bonding material or the like. Specifically, the first end portion 41 of the support substrate 4 is inserted into a through hole formed in the upper plate portion 231. Note that the first end portion 41 of the support substrate 4 need not be inserted into the through hole. As a result of the first end portion 41 of the support substrate 4 being attached to the manifold 2 in this manner, the first end portion 41 of the support substrate 4 is linked to the gas supply chamber 21 and the gas collection chamber 22.

The support substrate 4 includes a plurality of first gas channels 43 and a plurality of second gas channels 44. The first gas channels 43 extend in the vertical direction in the support substrate 4. That is, the first gas channels 43 extend in the length direction (the X-axis direction) of the support substrate 4. The first gas channels 43 pass through the support substrate 4. The first gas channels 43 are disposed at intervals in the width direction (the Y-axis direction) of the support substrate 4. Note that the first gas channels 43 are preferably disposed at equal intervals. The length of the support substrate 4 in the width direction (the Y-axis direction) may be longer than the length of the support substrate 4 in the length direction (the X-axis direction).

As shown in FIG. 4, the first gas channels 43 extend from the first end portion 41 of the support substrate 4 to the second end portion 42 of the support substrate 4. The first gas channels 43 are connected to the gas supply chamber 21 on the first end portion 41 side in a state in which the fuel cell 10 is attached to the manifold 2.

The second gas channels 44 extend in the vertical direction in the support substrate 4. That is, the second gas channels 44 extend in the length direction (the X-axis direction) of the support substrate 4. The second gas channels 44 extend substantially in parallel to the first gas channels 43.

The second gas channels 44 pass through the support substrate 4. The second gas channels 44 are disposed at intervals in the width direction (the Y-axis direction) of the support substrate 4. Note that the second gas channels 44 are preferably disposed at equal intervals. Also, a pitch p2 between second gas channels 44 is preferably substantially equal to a pitch p1 between first gas channels 43. Note that a pitch between gas channels refers to the distance between centers of adjacent gas channels. For example, an average value of pitches of gas channels in the first end portion 41, the central portion, and the second end portion 42 can be used as a pitch between adjacent gas channels.

The second gas channels 44 extend from the second end portion 42 of the support substrate 4 to the first end portion 41 of the support substrate 4. The second gas channels 44 are connected to the gas collection chamber 22 of the manifold 2 on the first end portion 41 side in a state in which the fuel cell 10 is attached to the manifold 2.

Also, a distance d1 between a first gas channel 43 and a second gas channel 44 that are adjacent to each other is larger than a distance d2 between adjacent first gas channels 43.

The first gas channels 43 and the second gas channels 44 are connected to each other on the second end portion 42 side of the support substrate 4. Specifically, the first gas channels 43 and the second gas channels 44 are connected to each other via a connection channel 30 of the connection member 3.

The first gas channels 43 and the second gas channels 44 are configured such that a pressure loss of gas in the first gas channels 43 is smaller than a pressure loss of gas in the second gas channels 44. Note that, as in this embodiment, if a plurality of first gas channels 43 and a plurality of second gas channels 44 are present, the first gas channels 43 and the second gas channels 44 are configured such that an average value of pressure losses of gas in the first gas channels 43 is smaller than an average value of pressure losses of gas in the second gas channels 44.

For example, the flow channel cross-sectional area of each first gas channel 43 can be larger than the flow channel cross-sectional area of each second gas channel 44. Note that, if the number of first gas channels 43 is different from the number of second gas channels 44, the sum of the flow channel cross-sectional areas of the first gas channels 43 can be larger than the sum of the flow channel cross-sectional areas of the second gas channels 44.

The sum of the flow channel cross-sectional areas of the second gas channels 44, although not particularly limited, may be set to about 20% to 95% of the sum of the flow channel cross-sectional areas of the first gas channels 43. Note that the flow channel cross-sectional area of a first gas channel 43 may be set to about 0.5 to 20 mm$^2$, for example. Also, the flow channel cross-sectional area of a second gas channel 44 may be set to about 0.1 to 15 mm$^2$, for example.

Note that the flow channel cross-sectional area of the first gas channel 43 refers to the flow channel cross-sectional area of the first gas channel 43 on the cross-section obtained by cutting the first gas channel 43 along a plane (the YZ plane) orthogonal to a direction (the X-axis direction) in which the first gas channel 43 extends. Also, an average value of the flow channel cross-sectional area at any position on the first end portion 41 side, the flow channel cross-sectional area at any position of the central portion, and the flow channel cross-sectional area at any position on the second end portion 42 side can be used as the flow channel cross-sectional area of the first gas channel 43.

Also, the flow channel cross-sectional area of the second gas channel 44 refers to the flow channel cross-sectional area of the second gas channel 44 on the cross-section obtained by cutting the second gas channel 44 along a plane (the YZ plane) orthogonal to a direction (the X-axis direction) in which the second gas channel 44 extends. Also, an average value of the flow channel cross-sectional area at any position on the first end portion 41 side, the flow channel cross-sectional area at any position of the central portion, and the flow channel cross-sectional area at any position on the second end portion 42 side can be used as the flow channel cross-sectional area of the second gas channel 44.

As shown in FIG. 3, the support substrate 4 includes a first main surface 45 and a second main surface 46. The first main surface 45 and the second main surface 46 face away from each other. The first main surface 45 and the second main surface 46 support the power generation element portions 5. The first main surface 45 and the second main surface 46 are oriented in the thickness direction (the Z-axis direction) of the support substrate 4. Also, side surfaces 47 of the support substrate 4 are oriented in the width direction (the Y-axis direction) of the support substrates 4. The side surfaces 47 may be curved. As shown in FIG. 1, the support substrates 4 are disposed such that the first main surfaces 45 and the second main surfaces 46 face each other.

As shown in FIG. 3, the support substrate 4 supports power generation element portions 5. The support substrate 4 is constituted by a porous material having no electron conductivity. The support substrate 4 is constituted by CSZ (calcia stabilized zirconia), for example. Alternatively, the support substrate 4 may be constituted by NiO (nickel oxide) and YSZ (8YSZ) (yttria-stabilized zirconia), NiO (nickel oxide) and $Y_2O_3$ (yttria), or MgO (magnesium oxide) and $MgAl_2O_4$ (magnesia alumina spinel). The support substrate 4 has a porosity of about 20% to 60%, for example. The porosity is measured using the Archimedes' method, or through microstructure observation, for example.

The support substrate 4 is covered by a compact layer 48. The compact layer 48 is configured to keep gas that is diffused from the first gas channels 43 and the second gas channels 44 into the support substrate 4 from being ejected to the outside. In this embodiment, the compact layer 48 covers the first main surface 45, the second main surface 46, and the side surfaces 47 of the support substrate 4. Note that, in this embodiment, the compact layer 48 is constituted by electrolytes 7 and interconnectors 91, which will be described later. The compact layer 48 is more compact than the support substrate 4. For example, the compact layer 48 has a porosity of about 0% to 7%.

As shown in FIG. 4, the support substrate 4 is configured such that gas flows in the support substrate 4 and moves between the first gas channels 43 and the second gas channel 44 during operation of the fuel cell 10, in a portion of the support substrate 4 that is farther toward the first end portion 41 side than the power generation element portion 5 is. Note that, in this embodiment, the support substrate 4 is configured such that, as indicated by an arrow G in FIG. 4, gas flows in the support substrate 4 from the first gas channel 43 toward the second gas channel 44.

For example, as a result of adjusting the porosity of the support substrate 4, adjusting the flow channel area of the first gas channel 43 or the second gas channel 44, or adjusting the distance d1 between the first gas channel 43 and the second gas channel 44, as indicated by the arrow G, fuel gas can flow in the support substrate 4 in a portion thereof that is farther toward the first end portion 41 side than the power generation element portion 5 is. In addition, the flow rate of gas flowing through a first gas channel 43 located on the second gas channel 44 side, the flow velocities of gas flowing through the first gas channel 43, out of the plurality of first gas channels 43, the pore size of the support substrate 4, or the like may also be adjusted.

Figure 5:
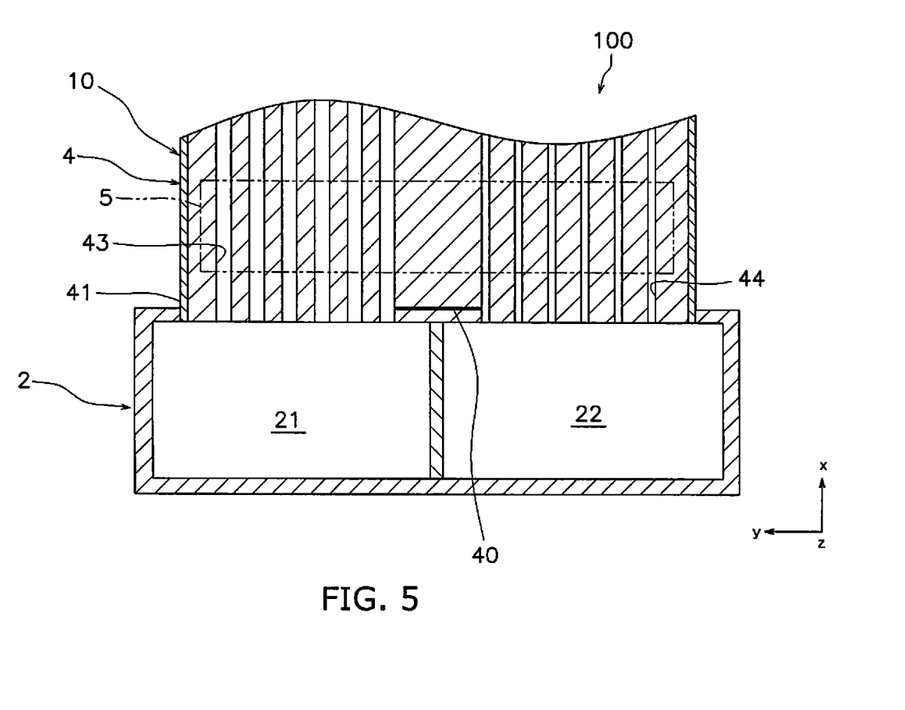
FIG. 5 is an enlarged cross-sectional view of the cell stack device.

Furthermore, as shown in FIG. 5, a short channel 40 for linking the first gas channel 43 and the second gas channel 44 that are adjacent to each other may also be formed in the support substrate 4 farther toward the first end portion 41 side than the power generation element portion 5 is. As indicated by the arrow G shown in FIG. 4, gas flows via this short channel 40. The flow channel diameter of the short channel 40 is smaller than the flow channel diameters of the first gas channel 43 and the second gas channel 44. The flow channel diameter of the short channel 40, although not particularly limited, is about 0.01 to 5% of the flow channel diameter of the first gas channel 43.

Figure 6:
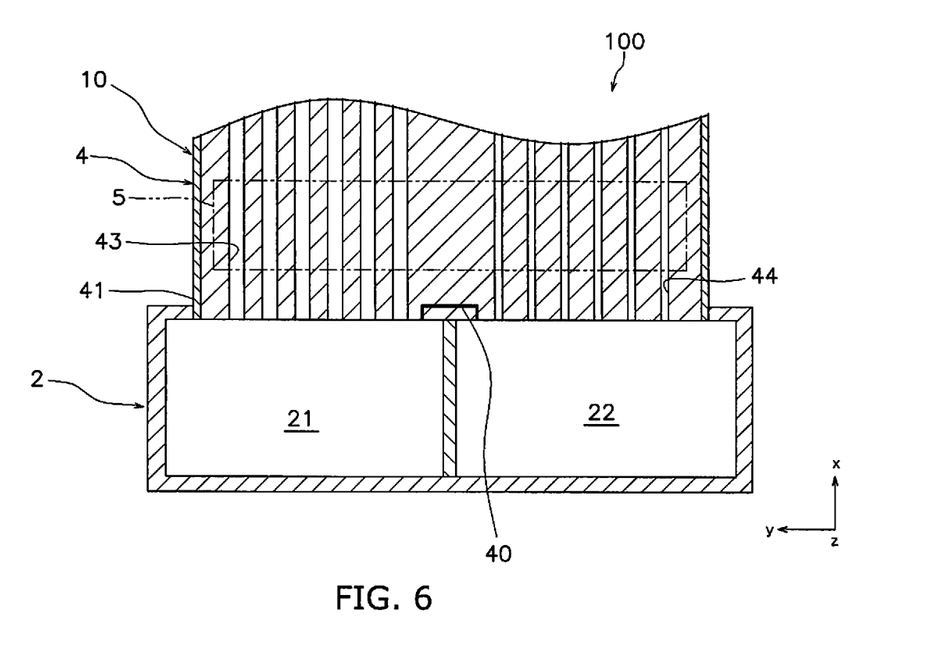
FIG. 6 is an enlarged cross-sectional view of the cell stack device.

As shown in FIG. 6, the short channel 40 may also be configured to directly link the gas supply chamber 21 and the gas collection chamber 22. Specifically, the short channel 40 is formed farther toward the first end portion 41 side than the power generation element portion 5 is, in the support substrate 4 between the first gas channel 43 and the second gas channel 44 that are adjacent to each other. Also, one end portion of the short channel 40 is open in the gas supply chamber 21, and the other end portion thereof is open in the gas collection chamber 22. Note that the one end portion of the short channel 40 may be open in either the first gas channel 43 or the gas supply chamber 21, and the other end portion of the short channel 40 may be open in either the second gas channel 44 or the gas collection chamber 22.

Note that being "farther toward the first end portion 41 side than the power generation element portion 5 is" refers to being farther toward the first end portion 91 side than the power generation element portion 5 is, of the plurality of power generation element portions 5, which is disposed closest to the first end portion 41. If the power generation element portions 5 are disposed on both the first main surface 45 and the second main surface 46 of the support substrate 4, being "farther toward the first end portion 41 side than the power generation element portion 5 is" refers to being farther toward the first end portion 41 side than the power generation element portion 5 is, of the power generation element portions 5, which is disposed closest to the first end portion 41.

Figure 7:
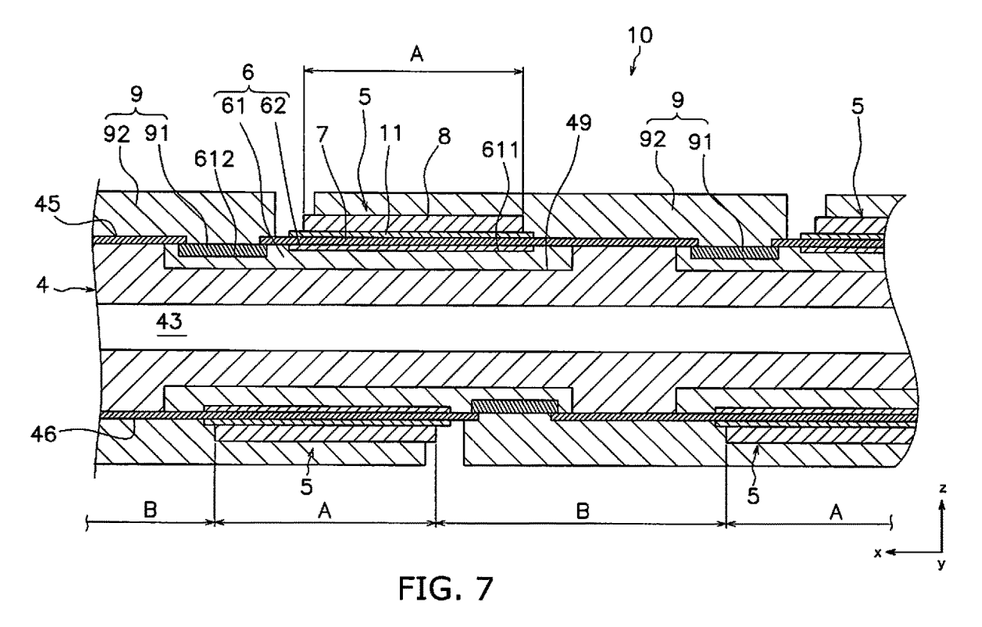
FIG. 7 is a cross-sectional view of the fuel cell.

Also, as shown in FIG. 7, the power generation element portion 5 refers to an active region A where an air electrode 8 overlaps a fuel electrode active portion 62, which will be described later, in a front view (the Z-axis view) of the fuel cell 10. That is, "a region that is farther toward the first end portion 91 side than the power generation element portion 5 is" refers to an inactive region B extending from an end surface of the support substrate 4 on the first end portion 41 side to the active region A. Note that the inactive region B refers to a region other than the active region A.

It is possible to confirm that gas flows in the support substrate 4 in the route indicated by the arrow G through fluid simulation or with use of a method such as particle image velocimetry (PIV). In addition, it is possible to confirm that gas flows in the support substrate 4 in the route indicated by the arrow G with use of the following method.

A span gas concentration sensor for detecting the concentration of span gas (hydrogen, municipal gas, or the like) is installed in the gas collection chamber 22 of the manifold 2 or a downstream channel with respect to the gas collection chamber 22. Then, the cell stack device 100 is filled with zero gas (air, inert gas, or the like). That is, the gas supply chamber 21, the gas collection chamber 22, the first gas channels 43, the second gas channels 44, and the connection channels 30 are filled with zero gas. Then, span gas (hydrogen or municipal gas) is supplied to the gas supply chamber 21 of the manifold 2, and the concentration of span gas is detected over time with use of the span gas concentration sensor. As a result of observing a temporal change in the concentration of span gas, it is possible to check whether or not gas flows in the route indicated by the arrow G.

Figure 8:
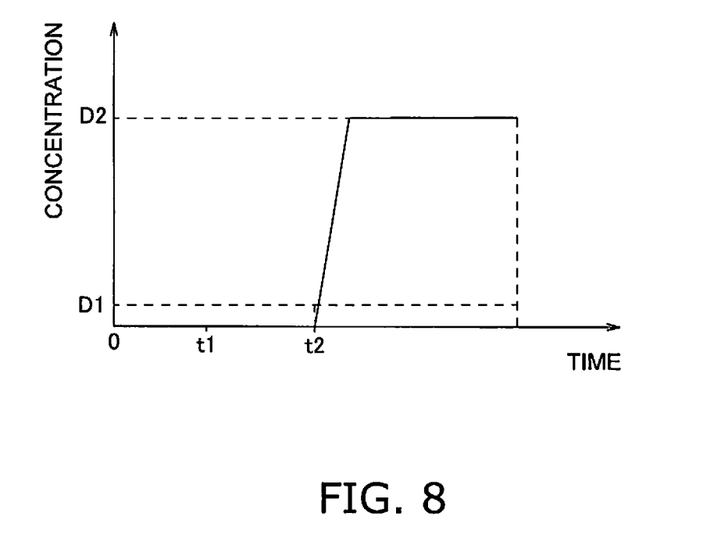
FIG. 8 is graph showing a temporal change in the hydrogen concentration.
Figure 9:
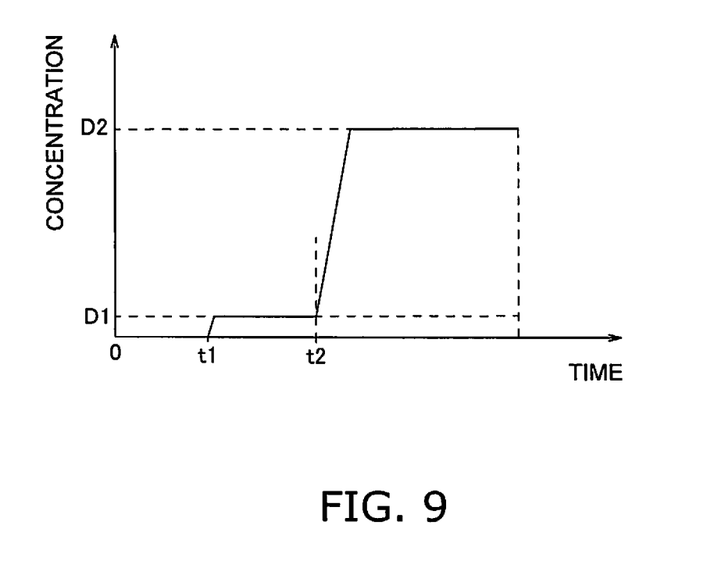
FIG. 9 is graph showing a temporal change in the hydrogen concentration.

Specifically, as shown in FIG. 8, with regard to a temporal change in the concentration of span gas, if the concentration of span gas rapidly increases from a zero-state to D2 after a predetermined time t2 has passed, it can be confirmed that no fuel gas flows in the route indicated by the arrow G, and span gas flows in the order of the first gas channels 43, the connection channels 30, and the second gas channels 44. On the other hand, as shown in FIG. 9, if the concentration of span gas temporarily increases from the zero-state to D1 after a predetermined time t1 has passed and then the concentration of span gas further increases from D1 to D2 after the predetermined time t2 has passed, it can be confirmed that fuel gas flows in the route indicated by the arrow G. That is, the span gas concentration sensor detects fuel gas that has flowed in the route indicated by the arrow G, and after the concentration of span gas increases to D1, the span gas concentration sensor detects span gas that has flowed in the order of the first gas channels 43, the connection channels 30, and the second gas channels 44, and it is possible to confirm that the concentration of span gas further increases to D2.

Power Generation Element Portion

The plurality of power generation element portions 5 are supported on the first main surface 45 and the second main surface 46 of the support substrate 4. The power generation element portions 5 are arranged in the length direction (the X-axis direction) of the support substrate 4. Specifically, the power generation element portions 5 are disposed at intervals from the first end portion 41 to the second end portion 42 on the support substrate 4. That is, the power generation element portions 5 are disposed at intervals in the length direction (the X-axis direction) of the support substrate 4. Note that the power generation element portions 5 are connected to each other in series by electrical connection portions 9, which will be described later.

The power generation element portions 5 each extend in the width direction (the Y-axis direction) of the support substrate 4. The power generation element portion 5 is divided into a first portion 51 and a second portion 52 in the width direction of the support substrate 4. Note that there is no strict boundary between the first portion 51 and the second portion 52. For example, in a state in which the fuel cells 10 are attached to the manifold 2, in a longitudinal view (the X-axis view) of the support substrate 4, a portion overlapping the boundary between the gas supply chamber 21 and the gas collection chamber 22 can be referred to as a boundary portion between the first portion 51 and the second portion 52.

In the thickness view (the Z-axis view) of the support substrate 4, the first gas channels 43 overlap the first portions 51 of the power generation element portions 5. Also, in the thickness view (the Z-axis view) of the support substrate 4, the second gas channels 44 overlap the second portions 52 of the power generation element portions 5. Note that some of the first gas channels 43 need not overlap the first portions 51. Similarly, some of the second gas channels 44 need not overlap the second portions 52.

FIG. 7 is a cross-sectional view of the fuel cell 10 cut along the first gas channel 43. Note that the cross-sectional view of the fuel cell 10 cut along the second gas channel 44 is the same as that in FIG. 7, except that the flow channel cross-sectional area of the second gas channel 44 is different from that in FIG. 7.

The power generation element portions 5 include fuel electrodes 6, the electrolytes 7, and air electrodes 8. Also, the power generation element portions 5 further include reaction preventing films 11. The fuel electrode 6 is a sintered body constituted by a conductive porous material. The fuel electrode 6 includes a fuel electrode current collector portion 61 and a fuel electrode active portion 62.

The fuel electrode current collector portion 61 is disposed in a recess 49. The recess 49 is formed in the support substrate 4. Specifically, the recess 49 is filled with the fuel electrode current collector portion 61, and the fuel electrode current collector portion 61 has the same outer shape as the recess 49. The fuel electrode current collector portions 61 each have a first recess 611 and a second recess 612. The fuel electrode active portion 62 is disposed in the first recess 611. Specifically, the first recess 611 is filled with the fuel electrode active portion 62.

The fuel electrode current collector portion 61 may be constituted by NiO (nickel oxide) and YSZ (8YSZ) (yttria-stabilized zirconia), for example. Alternatively, the fuel electrode current collector portion 61 may also be constituted by NiO (nickel oxide) and $Y_2O_3$ (yttria), or NiO (nickel oxide) and CSZ (calcia stabilized zirconia). The fuel electrode current collector portion 61 has a thickness of about 50 to 500 μm and the recess 49 have a depth of about 50 to 500 μm.

The fuel electrode active portion 62 may be constituted by NiO (nickel oxide) and YSZ (8YSZ) (yttria-stabilized zirconia), for example. Alternatively, the fuel electrode active portion 62 may also be constituted by NiO (nickel oxide) and GDC (gadolinium doped ceria). The fuel electrode active portion 62 has a thickness of 5 to 30 μm.

The electrolyte 7 is disposed covering the fuel electrode 6. Specifically, the electrolyte 7 extends in the length direction from one interconnector 91 to another interconnector 91. That is, the electrolytes 7 and the interconnectors 91 are disposed in an alternating manner in the length direction (the X-axis direction) of the support substrate 4. Also, the electrolytes 7 cover the first main surface 45, the second main surface 46, and the side surfaces 47 of the support substrate 4.

The electrolyte 7 is more compact than the support substrate 4. For example, the electrolyte 7 has a porosity of about 0% to 7%. The electrolyte 7 is a sintered body constituted by a compact material having ionic conductivity and no electron conductivity. The electrolyte 7 may be constituted by YSZ (8YSZ) (yttria-stabilized zirconia), for example. Alternatively, the electrolyte 7 may also be constituted by LSGM (lanthanum gallate). The electrolyte 7 has a thickness of about 3 to 50 μm, for example.

The reaction preventing film 11 is a sintered body constituted by a compact material. The reaction preventing film 11 has a shape that is substantially the same as that of the fuel electrode active portion 62, in a plan view. The reaction preventing film 11 is disposed at a position corresponding to the fuel electrode active portion 62 via the electrolyte 7. The reaction preventing film 11 is provided in order to suppress the occurrence of a phenomenon in which a reaction layer with large electric resistance is formed at an interface between the electrolyte 7 and the air electrode 8 through a reaction between YSZ in the electrolyte 7 and Sr in the air electrode 8. The reaction preventing film 11 may be constituted by GDC=(Ce, Gd)$O_2$ (gadolinium doped ceria), for example. The reaction preventing film 11 has a thickness of about 3 to 50 μm, for example.

The air electrode 8 is disposed on the reaction preventing film 11. The air electrode 8 is a sintered body constituted by a conductive porous material. The air electrode 8 may be constituted by LSCF=(La, Sr)(Co, Fe)$O_3$ (lanthanum stron-tium cobalt ferrite), for example. Alternatively, the air electrode 8 may also be constituted by LSF=(La, Sr)FeO$_3$ (lanthanum strontium ferrite), LNF=La (Ni, Fe)O$_3$ (lanthanum nickel ferrite), LSC=(La, Sr)CoO$_3$ (lanthanum strontium cobaltite), or the like. Also, the air electrode 8 may be constituted by two layers of a first layer (inner layer) constituted by LSCF and a second layer (outer layer) constituted by LSC. The air electrode 8 has a thickness of 10 to 100 μm, for example.

Electrical Connection Portion

An electrical connection portion 9 is configured to electrically connect adjacent power generation element portions 5. The electrical connection portion 9 includes an interconnector 91 and an air electrode current collector film 92. The interconnector 91 is disposed in the second recess 612. Specifically, the interconnector 91 is embedded in the second recess 612 (the second recess 612 is filled with the interconnector 91). The interconnector 91 is a sintered body constituted by a conductive compact material. The interconnector 91 is more compact than the support substrate 4. For example, the interconnector 91 has a porosity of about 0% to 7%. The interconnector 91 may be constituted by LaCrO$_3$ (lanthanum chromite), for example. Alternatively, the interconnector 91 may also be constituted by (Sr, La)TiO$_3$ (strontium titanate). The interconnector 91 has a thickness of 10 to 100 μm, for example.

The air electrode current collector film 92 is disposed to extend between the interconnector 91 and the air electrode 8 of adjacent power generation element portions 5. For example, the air electrode current collector film 92 is disposed such that the air electrode 8 of the power generation element portion 5 disposed on the left side in FIG. 7 and the interconnector 91 of the power generation element portion 5 disposed on the right side in FIG. 7 are electrically connected to each other. The air electrode current collector film 92 is a sintered body constituted by a conductive porous material.

The air electrode current collector film 92 may be constituted by LSCF=(La, Sr)(Co, Fe)O$_3$ (lanthanum strontium cobalt ferrite), for example. Alternatively, the air electrode current collector film 92 may also be constituted by LSC=(La, Sr)CoO$_3$ (lanthanum strontium cobaltite). Alternatively, the air electrode current collector film 92 may also be constituted by Ag (silver) or Ag—Pd (a silver palladium alloy). The air electrode current collector film 92 has a thickness of about 50 to 500 μm, for example.

Connection Member

As shown in FIG. 4, the connection member 3 is attached to the second end portion 42 of the support substrate 4. Also, the connection member 3 includes a connection channel 30 for connecting the first gas channels 43 and the second gas channels 44. Specifically, the connection channel 30 connects the first gas channels 43 and the second gas channels 44. The connection channel 30 is constituted by a space extending from the first gas channels 43 to the second gas channels 44. The connection member 3 is preferably joined to the support substrate 4. Also, the connection member 3 is preferably formed as a single body with the support substrate 4. Note that the number of connection channels 30 is smaller than the number of first gas channels 43. In this embodiment, a plurality of first gas channels 43 and a plurality of second gas channels 44 are connected to each other by only one connection channel 30.

The connection member 3 is a porous member, for example. Also, the connection member 3 includes a compact layer 31 constituting the outer surface thereof. The compact layer 31 is more compact than the main body of the connection member 3. For example, the compact layer 31 has a porosity of about 0% to 7%. This compact layer 31 may be made of the same material as the connection member 3, a material used in the above-described electrolyte 7, crystallized glass, or the like.

Method for Generating Power

In the cell stack device 100 configured as described above, fuel gas such as hydrogen gas is supplied to the gas supply chamber 21 of the manifold 2, and the fuel cells 10 are exposed to gas containing oxygen, such as air. Then, a chemical reaction indicated by Equation (1) below occurs in the air electrode 8, a chemical reaction indicated by Equation (2) occurs in the fuel electrode 6, and a current flows.

(1)

(2)

Specifically, fuel gas supplied to the gas supply chamber 21 flows through the first gas channels 43 of the fuel cells 10, and the chemical reaction indicated by Equation (2) above occurs in the fuel electrodes 6 of the power generation element portions 5. Unreacted fuel gas in the fuel electrodes 6 leaves the first gas channels 43 and is supplied to the second gas channels 44 via the connection channel 30 of the connection member 3. Then, fuel gas supplied to the second gas channels 44 undergoes the chemical reaction indicated by Equation (2) above in the fuel electrodes 6 again. Unreacted fuel gas in the fuel electrodes 6 in a process in which fuel gas flows through the second gas channels 44 is collected in the gas collection chamber 22 of the manifold 2.

As described above, fuel gas supplied to the gas supply chamber 21 basically flows in the order of the first gas channels 43, the connection channel 30, and the second gas channels 44. On the other hand, as indicated by the arrow G, a portion of fuel gas flowing through the first gas channel 43 flows inside the support substrate 4 in a portion thereof that is farther toward the first end portion 41 side than the power generation element portion 5 is, from the first gas channel 43 toward the second gas channel 44. Then, the portion of fuel gas is sent from the second gas channel 44 to the gas collection chamber 22. This unreacted fuel gas is collected from the gas collection chamber 22, and is burned with use of a gas burner, for example. Thus, even if the cell stack device 100 instantaneously has a fuel utilization rate of 100%, it is possible to inhibit a misfire in a gas burner.

Variations

Although embodiments of the present invention have been described above, the present invention is not limited thereto, and various modifications can be made without departing from the spirit of the present invention.

Variation 1

Figure 10:
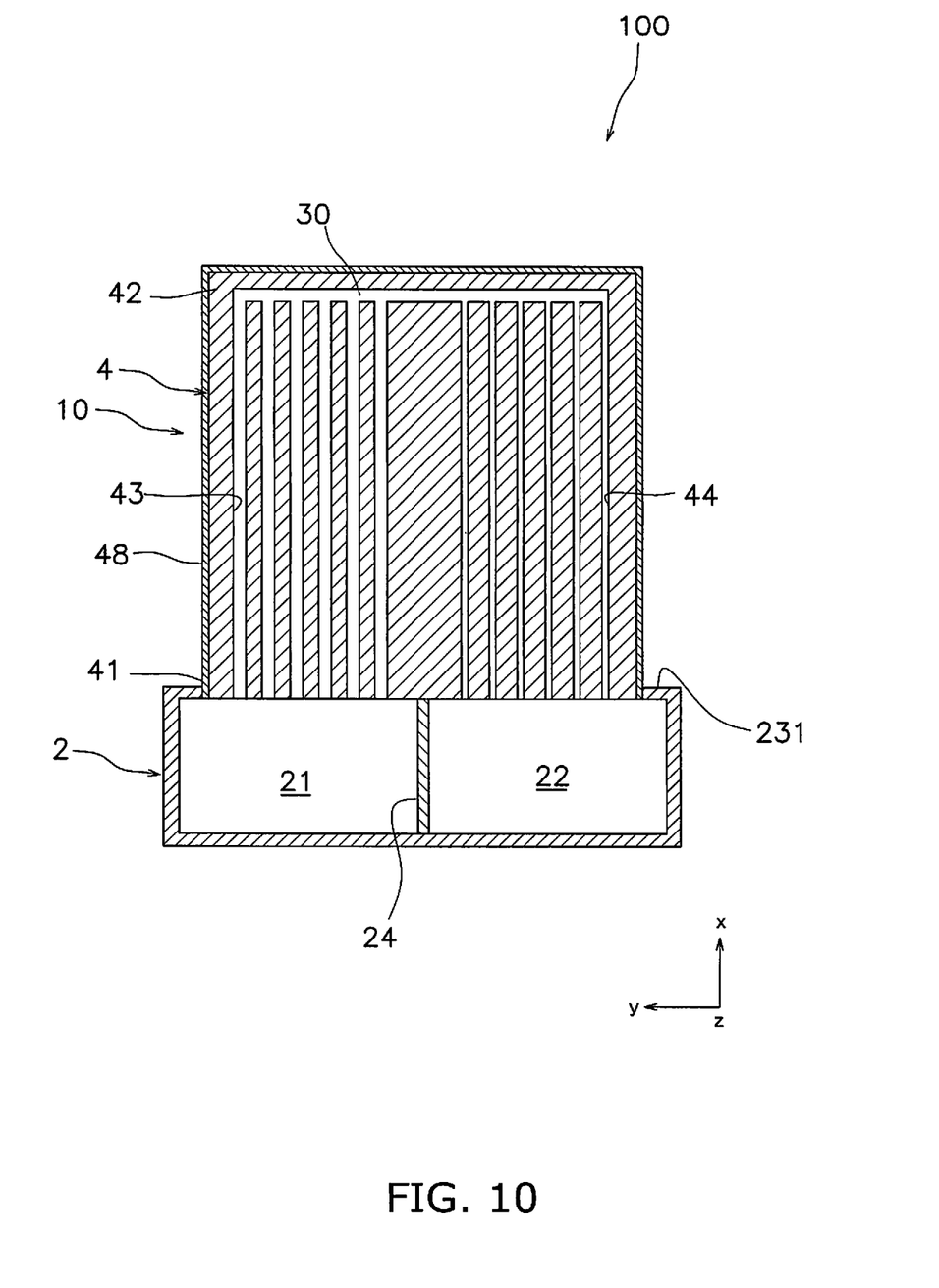
FIG. 10 is a cross-sectional view of a cell stack device according to a variation.

Although the first gas channels 43 and the second gas channels 44 are connected to each other by the connection channel 30 of the connection member 3 in the above-described embodiment, the configuration thereof is not limited thereto. For example, as shown in FIG. 10, the inner portion of the support substrate 4 may include the connection channel 30. In this case, the cell stack device 100 need not include the connection member 3. The first gas channels 43 and the second gas channels 44 are connected to each other by the connection channel 30 formed in the support substrate 4.

Variation 2

The first gas channels 43 may have different flow channel cross-sectional areas. Also, the second gas channels 44 may have different flow channel cross-sectional areas. Also, the flow channel cross-sectional area of the first gas channel 43 may be substantially the same as or smaller than the flow channel cross-sectional area of the second gas channel 44.

Variation 3

Figure 11:
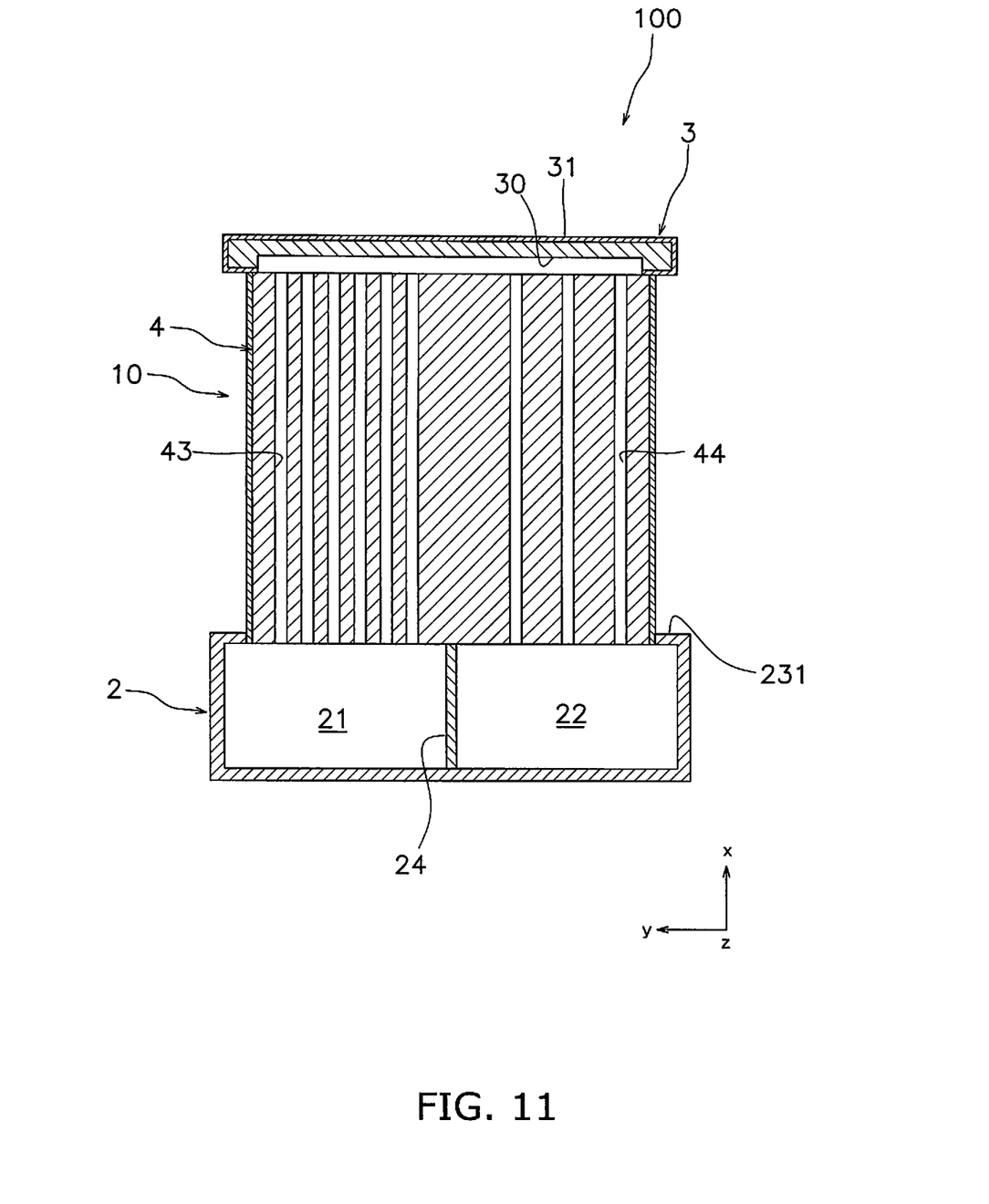
FIG. 11 is a cross-sectional view of a cell stack device according to a variation.

Although the number of second gas channels 44 is the same as the number of first gas channels 43 in the above-described embodiment, the number of second gas channels 44 is not limited thereto. For example, as shown in FIG. 11, the number of second gas channels 44 may be smaller than the number of first gas channels 43.

Variation 4

The first gas channel 43 need not have an even flow channel cross-sectional area in its length direction (the X-axis direction). In particular, the flow channel cross-sectional area of the first gas channel 43 may become smaller toward the second end portion 42 where the concentration of fuel gas is low. Also, the second gas channel 44 need not have an even flow channel cross-sectional area in the length direction (the X-axis direction). In particular, the flow channel cross-sectional area of the second gas channel 44 may become smaller toward the first end portion 41 where the concentration of fuel gas is low. This configuration makes it possible to keep Ni whose diffusibility is increased and that is present in the vicinity of an interface from changing into NiO.

Variation 5

Although the first and second gas channels 43 and 44 have a circular cross-section in the above-described embodiment, the cross-sectional shape of the first and second gas channels 43 and 44 may be a rectangle or an eclipse.

Variation 6

The support substrate 4 includes a plurality of first gas channels 43 in the above-described embodiment, but may include only one first gas channel 43. Similarly, the support substrate 4 includes a plurality of second gas channels 44, but may include only one second gas channel 44.

Variation 7

Although the power generation element portions 5 disposed on the first main surface 45 are connected to each other in series in the above-described embodiment, it is not necessary for all the power generation element portions 5 disposed on the first main surface 45 to be connected to each other in series. Note that the same applies to the power generation element portions 5 disposed on the second main surface 46.

Variation 8

In the fuel cell 10, spaces between the power generation element portions 5 formed on the first main surface 45 and the power generation element portions 5 formed on the second main surface 46 need not be electrically connected to each other, or may be electrically connected to each other at a plurality of portions.

Variation 9

The power generation element portions 5 are disposed on both the first main surface 45 and the second main surface 46 in the above-described embodiment, but may be disposed on only one of the first main surface 45 and the second main surface 46.

Variation 10

The fuel cells 10 may have different widths. Also, the power generation element portions 5 may have different widths. For example, the width of each power generation element portion 5 formed on a given support substrate 4 may be different from the width of each power generation element portion 5 formed on another support substrate 4.

Variation 11

Although the connection member 3 is a porous member in an embodiment, the connection member 3 may be constituted by metal. Specifically, the connection member 3 can be constituted by an Fe—Cr alloy, a Ni-based alloy, MgO-based ceramic material (may be the same material as the support substrate 4), or the like.

Variation 12

Figure 12:
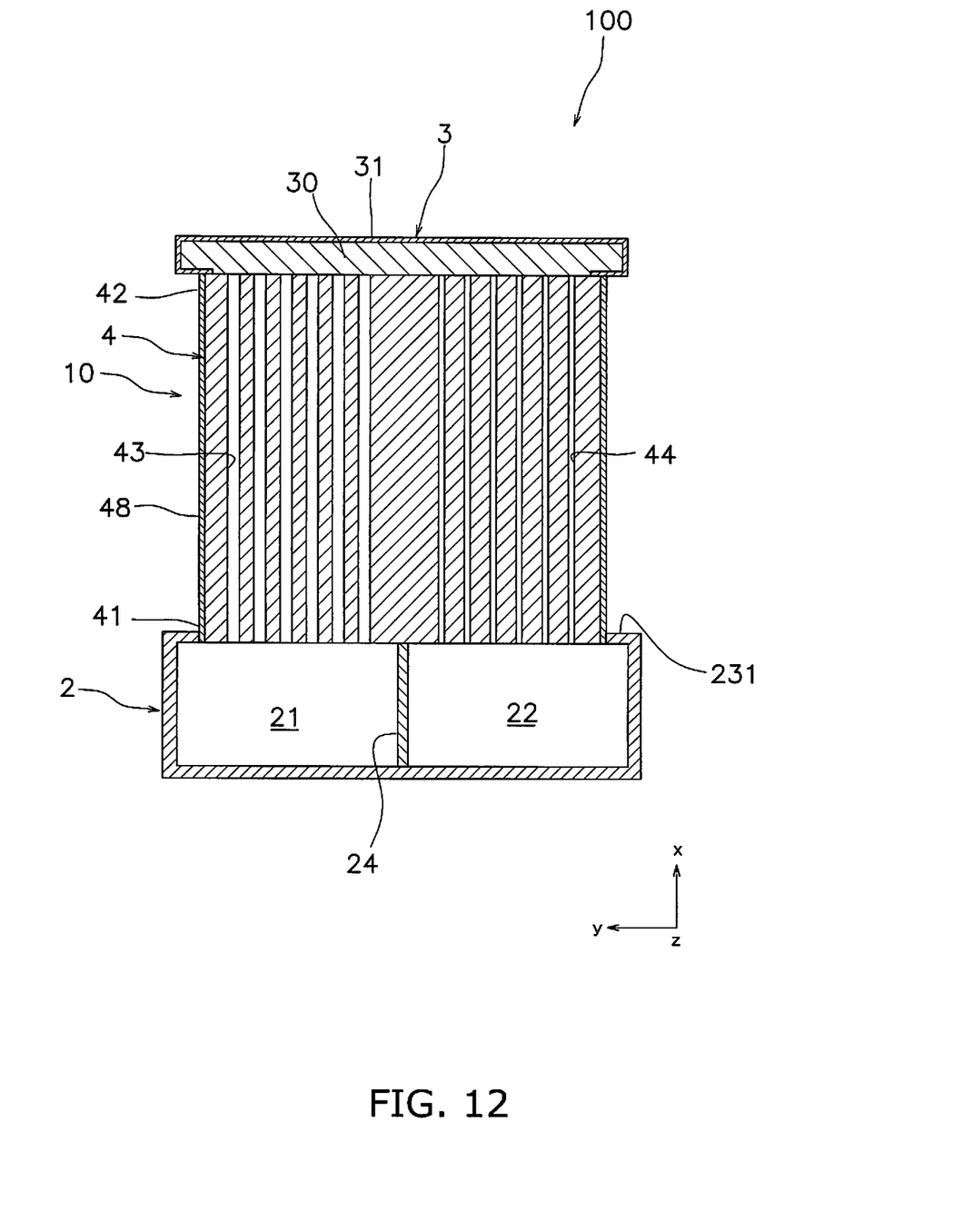
FIG. 12 is a cross-sectional view of a cell stack device according to a variation.

Although the connection channel 30 of the connection member 3 is constituted by a space in the above-described embodiment, the configuration of the connection channel 30 of the connection member 3 is not limited thereto. For example, as shown in FIG. 12, the connection channel 30 of the connection member 3 can be constituted by a plurality of pores formed in the connection member 3.

Variation 13

Although, the gas supply chamber 21 and the gas collection chamber 22 are defined in the manifold 2 of the above-described embodiment as a result of partitioning one manifold main body 23 with use of the partition plate 24, the configuration of the manifold 2 is not limited thereto. For example, the manifold 2 can also be constituted by two manifold main bodies 23. In this case, one manifold main body 23 includes the gas supply chamber 21, and another manifold main body 23 includes the gas collection chamber 22.

Variation 14

Although the fuel cells 10 of the above-described embodiment are so-called horizontal-stripe type fuel cells in which the power generation element portions 5 are arranged in the length direction (the X-axis direction) of the support substrate 4, the configuration of the fuel cells 10 is not limited thereto. For example, the fuel cells 10 may be so-called vertical-stripe type fuel cells in which one power generation element portion 5 is supported on the first main surface 45 of the support substrate 4. In this case, one power generation element portion 5 may be or need not be supported on the second main surface 46 of the support substrate 4.

Variation 15

Although an electrochemical cell of the present invention is used as a solid oxide fuel cell (SOFC) in the above-described embodiment, there is no limitation thereto. For example, an electrochemical cell of the present invention can also be used as a solid oxide electrolysis cell (SOEC). If the electrochemical cell according to the present invention is used as a solid oxide electrolysis cell in this manner, it is possible to obtain effects such as the following.

A solid oxide electrolysis cell 10 causes steam gas to flow in the order of the first gas channels 43 and the second gas channels 44 to produce hydrogen gas and oxygen gas. Here, produced hydrogen gas flowing through the second gas channels 44 flows in the support substrate 4 to the first gas channels 43 in a portion of the support substrate 4 that is farther toward the first end portion 41 side than the power generation element portion 5 is. As a result, hydrogen gas is mixed into steam gas that is to be supplied to the fuel electrode 6 of the power generation element portion 5 disposed on the first end portion 41 side, and thus it is possible to inhibit oxidation of nickel of the fuel electrode 6.

The invention claimed is:

1. An electrochemical cell that is configured to be linked to a gas supply portion and a gas collection portion, the electrochemical cell comprising:

a flat porous support substrate including a first end portion and a second end portion, the first end portion being configured to be linked to the gas supply portion and the gas collection portion, the second end portion being located opposite to the first end portion; and a power generation element portion disposed on a main surface of the support substrate, wherein the porous support substrate includes at least one first gas channel extending from the first end portion toward the second end portion, the first gas channel being configured to be connected to the gas supply portion, and at least one second gas channel connected to the first gas channel on the second end portion side, the second gas channel extending from the second end portion toward the first end portion, the second gas channel being configured to be connected to the gas collection portion, and only the porous support substrate is present between the first gas channel and the second gas channel, and the porous support substrate is configured such that gas flows in the porous support substrate and moves between the first gas channel and the second gas channel, in a portion of the porous support substrate that is farther toward the first end portion side than the power generation element portion is.

2. The electrochemical cell according to claim 1, wherein the support substrate further includes a connection channel for connecting the first gas channel and the second gas channel in the second end portion.

3. The electrochemical cell according to claim 1, further comprising a connection member including a connection channel for connecting the first gas channel and the second gas channel, the connection member being attached to the second end portion of the support substrate.

4. The electrochemical cell according to claim 2, wherein the at least one first gas channel includes a plurality of first gas channels, the at least one second gas channel includes a plurality of second gas channels, and the number of connection channels is only one.

5. The electrochemical cell according to claim 1, wherein a distance between a first gas channel and a second gas channel that are adjacent to each other is larger than a distance between first gas channels that are adjacent to each other.

6. A cell stack device comprising:

the electrochemical cell according to claim 1; and a manifold configured to support the first end portion of the support substrate, wherein the manifold includes a gas supply chamber and a gas collection chamber, the gas supply chamber being connected to the first gas channel, the gas collection chamber being connected to the second gas channel.

* * * * *